(12) United States Patent
Suzuki et al.

(10) Patent No.: US 11,183,206 B2
(45) Date of Patent: Nov. 23, 2021

(54) MAGNETIC TAPE CARTRIDGE, RECORDING DEVICE, RECORDING METHOD, AND DATA RECORDING, AND REPRODUCING SYSTEM USING A RECORDING MEDIUM INCLUDING A PREDETERMINED AREA FOR RECORDING DEFECT INFORMATION

(71) Applicant: FUJIFILM CORPORATION, Tokyo (JP)

(72) Inventors: Hodaka Suzuki, Kanagawa (JP); Toru Nakao, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/029,095

(22) Filed: Sep. 23, 2020

(65) Prior Publication Data
US 2021/0098016 A1     Apr. 1, 2021

(30) Foreign Application Priority Data

Sep. 26, 2019 (JP) .............................. JP2019-175124

(51) Int. Cl.
*G11B 5/008* (2006.01)
*G11B 15/06* (2006.01)
*G11B 23/04* (2006.01)
*G11B 23/113* (2006.01)
*G11B 25/06* (2006.01)
*G11B 5/592* (2006.01)

(52) U.S. Cl.
CPC .......... *G11B 5/00813* (2013.01); *G11B 15/06* (2013.01); *G11B 23/042* (2013.01); *G11B 23/113* (2013.01); *G11B 25/063* (2013.01); *G11B 5/5928* (2013.01)

(58) Field of Classification Search
None
See application file for complete search history.

(56) References Cited

U.S. PATENT DOCUMENTS

2005/0133583 A1\* 6/2005 Tada .................... G11B 23/037
235/375
2019/0073252 A1   3/2019 Tokai et al.

FOREIGN PATENT DOCUMENTS

JP   H11-242802 A   9/1999
JP   2005-063500 A  3/2005
JP   2019-046522 A  3/2019

\* cited by examiner

*Primary Examiner* — Craig A. Renner
(74) *Attorney, Agent, or Firm* — Solaris Intellectual Property Group, PLLC

(57) ABSTRACT

A magnetic tape cartridge including: a magnetic tape; and a recording medium including a predetermined area for recording defect information, which is information regarding a defect of the magnetic tape detected in a production process of the magnetic tape. A recording device, a recording method, a data recording and reproducing system, and a data recording and reproducing method are also provided.

11 Claims, 6 Drawing Sheets

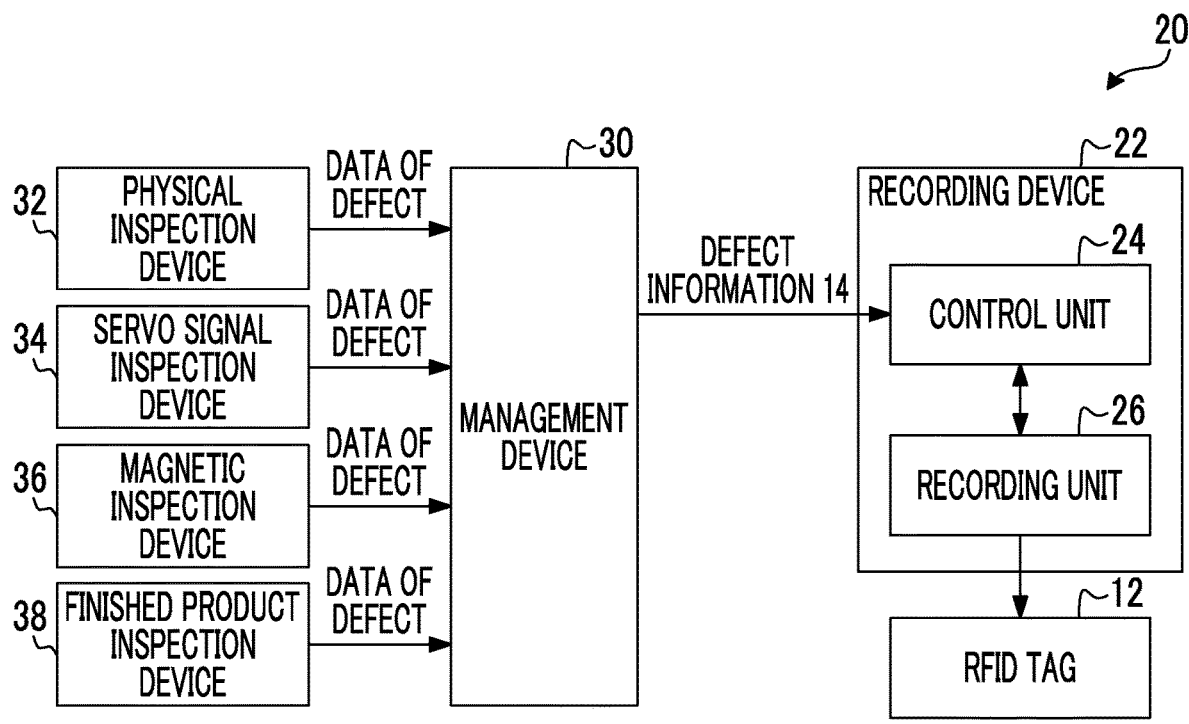

MAGNETIC TAPE CARTRIDGE, RECORDING DEVICE, RECORDING METHOD, AND DATA RECORDING, AND REPRODUCING SYSTEM USING A RECORDING MEDIUM INCLUDING A PREDETERMINED AREA FOR RECORDING DEFECT INFORMATION

CROSS REFERENCE TO RELATED APPLICATIONS

The present application claims priority under 35 U.S.C. § 119 to Japanese Patent Application No. 2019-175124 filed on Sep. 26, 2019, which is hereby expressly incorporated by reference, in its entirety, into the present application.

BACKGROUND

Technical Field

The present disclosure relates to a magnetic tape cartridge, a recording device, a recording method, a data recording and reproducing system, and a data recording and reproducing method.

Related Art

In the related art, there is disclosed a technology of inspecting defects of a magnetic tape, and discarding defective parts including defects and using only good parts, in a case of cutting the magnetic tape and incorporating the magnetic tape into a cartridge, in a manufacturing process of a magnetic tape cartridge (see JP2005-063500A).

In addition, there is disclosed a technology of storing a partition management table that holds information regarding whether or not each partition on a magnetic tape is accessible, in a non-volatile memory embedded in a cartridge containing the magnetic tape (see JP1999-242802A (JP-H11-242802A)). In the technology disclosed in JP1999-242802A (JP-H11-242802A), a magnetic tape device control unit performs recording and reproduction control by avoiding an area inaccessible due to deterioration of the magnetic tape, with reference to a partition management table.

In addition, there is provided a technology of recording information regarding an error rate of reading or writing of data with respect to the magnetic tape on an RFID tag included in a recording tape cartridge (see JP2019-046522A).

SUMMARY

In the technology disclosed in JP2005-063500A, a defective part of the magnetic tape including a defect is cut and discarded. Therefore, due to the convenience of the magnetic tape, a good part that does not contain a defect cannot be incorporated in the magnetic tape cartridge, and it may be forced to discard it. It is not desirable to discard good parts that do not contain defects, because it wastes resources and increases the environmental load.

In addition, the technology disclosed in JP1999-242802A (JP-H11-242802A) is to store the partition management table including information such as partitions that are inaccessible due to deterioration over time in a non-volatile memory, after shipping of the magnetic tape cartridge and during usage by the user. Therefore, it is not possible to prevent the disposal of the magnetic tape in the production process of the magnetic tape cartridge, and thus it is not possible to prevent the increase in environmental load. Similarly, the technology disclosed in JP2019-046522A is also to record the information regarding the error rate on the RFID tag after the shipping of the magnetic tape cartridge and during usage by the user.

The disclosure has been made in view of the above circumstances, and provides a magnetic tape cartridge, a recording device, a recording method, a data recording and reproducing system, and a data recording and reproducing method capable of preventing an increase in environmental load.

A magnetic tape cartridge according to an aspect of the disclosure comprises: a magnetic tape; and a recording medium including a predetermined area for recording defect information, which is information regarding a defect of the magnetic tape detected in a production process of the magnetic tape.

In the magnetic tape cartridge of the disclosure, the defect information may include information indicating a position of the defect on the magnetic tape in a longitudinal direction.

In the magnetic tape cartridge of the disclosure, the defect information may include information indicating a position of the defect on the magnetic tape in a width direction.

In the magnetic tape cartridge according to the disclosure, the defect information may include information indicating a type of the defect.

In the magnetic tape cartridge of the disclosure, the defect may be determined to be unsuitable based on a quality management standard of the magnetic tape.

In the magnetic tape cartridge of the disclosure, the quality management standard may be defined by specifications of the magnetic tape.

In the magnetic tape cartridge of the disclosure, the recording medium may be an RFID tag.

A recording device according to another aspect of the disclosure comprises: a recording unit which records defect information on a recording medium of a magnetic tape cartridge.

A recording method according to still another aspect of the disclosure includes recording defect information on a recording medium of a magnetic tape cartridge.

A data recording and reproducing system according to still another aspect of the disclosure comprises: a reading unit which reads defect information recorded on a recording medium of a magnetic tape cartridge; and a recording and reproducing unit which performs at least one of recording or reproducing of data with respect to a magnetic tape of a recording tape cartridge based on the defect information.

A data recording and reproducing method according to still another aspect of the disclosure includes: reading defect information recorded on a recording medium of a magnetic tape cartridge; and performing at least one of recording or reproducing data with respect to a magnetic tape of a recording tape cartridge based on the defect information.

According to the disclosure, it is possible to prevent an increase in environmental load.

BRIEF DESCRIPTION OF THE DRAWINGS

FIG. 5 is a block diagram showing an example of a configuration of a defect information recording system.

FIG. 6 is a diagram showing an example of contents of defect information.

DESCRIPTION OF EMBODIMENTS

Figure 1:
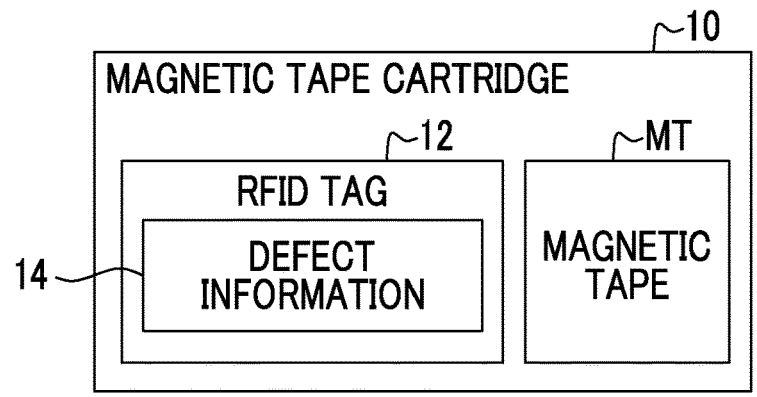
FIG. 1 is a block diagram showing an example of a configuration of a magnetic tape cartridge.

Hereinafter, embodiments for carrying out the technology of the disclosure will be described in detail with reference to the drawings.

First, servo patterns used in the following embodiments will be described before describing the details of the embodiments.

For various steps for manufacturing a magnetic tape, a description disclosed in paragraphs 0067 to 0070 of JP2010-231843A can be referred to. A servo pattern can also be formed on the magnetic tape by a well-known method, in order to realize tracking control of a magnetic head of a magnetic tape device and control of a running speed of the magnetic tape. The "formation of the servo pattern" can be "recording of a servo signal". The servo signal is generally recorded along a longitudinal direction of the magnetic tape. As a method of control using a servo signal, timing-based servo, amplitude servo, or frequency servo is used. Hereinafter, the recording of the servo signal will be further described.

As shown in European Computer Manufacturers Association (ECMA)-319, a timing-based servo system is adopted in a magnetic tape based on the Linear Tape-Open (LTO) standard (generally referred to as "LTO tape"). In this timing-based servo method, the servo signal is configured by continuously disposing a plurality of pairs of magnetic stripes (also referred to as "servo stripes") not parallel to each other in a longitudinal direction of the magnetic tape. As described above, a reason for that the servo signal is configured with one pair of magnetic stripes not parallel to each other is because a servo reproducing element passing on the servo signal recognizes a passage position thereof. Specifically, one pair of the magnetic stripes are formed so that a gap thereof is continuously changed along the width direction of the magnetic tape, and a relative position of the servo signal and the servo reproducing element can be recognized, by the reading of the gap thereof by the servo reproducing element. The information of this relative position can realize the tracking of a data track. Accordingly, a plurality of servo tracks are generally set on the servo signal along the width direction of the magnetic tape.

The servo band is configured of a servo signal continuous in the longitudinal direction of the magnetic tape. A plurality of servo bands are normally provided on the magnetic tape. A region interposed between two adjacent servo bands is called a data band. The data band is configured to include a plurality of data tracks and each data track corresponds to each servo track.

In addition, in one embodiment, as disclosed in JP2004-318983A, information indicating a servo band number (also referred to as "servo band ID (Identification)") is embedded in each servo band. This servo band ID is recorded by shifting a specific servo stripe among the plurality of pairs of servo stripes in the servo band so that the position thereof is relatively displaced in the longitudinal direction of the magnetic tape. Specifically, the method for shifting the specific servo stripe among the plurality of pairs of servo stripes is changed for each servo band. Accordingly, the recorded servo band ID is unique for each servo band, and therefore, the servo band can be uniquely specified by only reading one servo band by the servo reproducing element.

As a method for specifying the servo band, a method using shifting in the longitudinal direction between the adjacent servo bands as shown in ECMA-319 is used. In this method, the group of one pair of magnetic stripes not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified in a case of reading the adjacent servo signals by two servo reproducing elements at the same time.

In addition, as shown in ECMA-319, information showing the position in the longitudinal direction of the magnetic tape (also referred to as "LPOS information") is normally embedded in each servo band. This LPOS information is recorded so that the position of one pair of servo stripes are shifted in the longitudinal direction of the magnetic tape, in the same manner as the servo band ID. However, unlike the servo band ID, the same signal is recorded on each servo band in this LPOS information.

Other information different from the servo band ID and the LPOS information can be embedded in the servo band. In this case, the embedded information may be different for each servo band as the servo band ID, or may be common in all of the servo bands, as the LPOS information. In addition, as a method of embedding the information in the servo band, a method other than the method described above can also be used. For example, a predetermined code may be recorded by thinning out a predetermined pair among the group of pairs of the servo stripes.

A servo signal recording head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of recording the servo signal, by inputting a current pulse while causing the magnetic tape to run on the servo write head, the magnetic pattern corresponding to the pair of gaps is transferred to the magnetic tape, and the servo signal can be recorded. A width of each gap can be suitably set in accordance with a density of the servo signal to be recorded. The width of each gap can be set as, for example, equal to or smaller than 1 µm, 1 to 10 µm, or equal to or greater than 10 µm.

Before recording the servo signal on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. In addition, the erasing process can also be performed in an oblique direction. The erasing process may be performed with respect to all of the magnetic tape or may be performed for each servo band of the magnetic tape.

A direction of the magnetic field to the servo signal to be recorded is determined in accordance with the direction of erasing. For example, in a case where the horizontal DC erasing is performed to the magnetic tape, the recording of the servo signal is performed so that the direction of the magnetic field and the direction of erasing are opposite to each other. Accordingly, the output of the servo signal obtained by the reading of the servo signal can be increased. As disclosed in JP2012-053940A, in a case where the pattern is transferred to the magnetic tape subjected to the vertical DC erasing by using the gap, the reading signal of the recorded servo signal has a unipolar pulse shape. Meanwhile, in a case where the pattern is transferred to the magnetic tape subjected to the horizontal DC erasing by using the gap, the reading signal of the recorded servo signal has a bipolar pulse shape.

As a head other than the magnetic head which performs at least one of the recording of data or the reproducing of data, a magnetic head comprising a servo reproducing element may be included in the magnetic tape device. For example, the magnetic head can include two servo reproducing elements, and each of the two servo reproducing elements can simultaneously read two adjacent servo bands. One or a plurality of elements for data can be disposed between the two servo reproducing elements.

A configuration of a magnetic tape cartridge 10 according to the embodiment will be described with reference to FIGS. 1 and 2. As shown in FIG. 1, the magnetic tape cartridge 10 comprises a magnetic tape MT on which information is magnetically recorded, and a radio frequency identifier (RFID) tag 12 as an example of a recording medium different from the magnetic tape MT. The RFID tag 12 is a recording medium capable of recording and reading information by wireless communication or the like in a contactless manner, and includes a predetermined area for recording defect information 14 which is information regarding a defect of the magnetic tape MT detected in a production process of the magnetic tape MT. Details of the defect information 14 will be described later. An example of the magnetic tape MT is an LTO tape.

Figure 2:
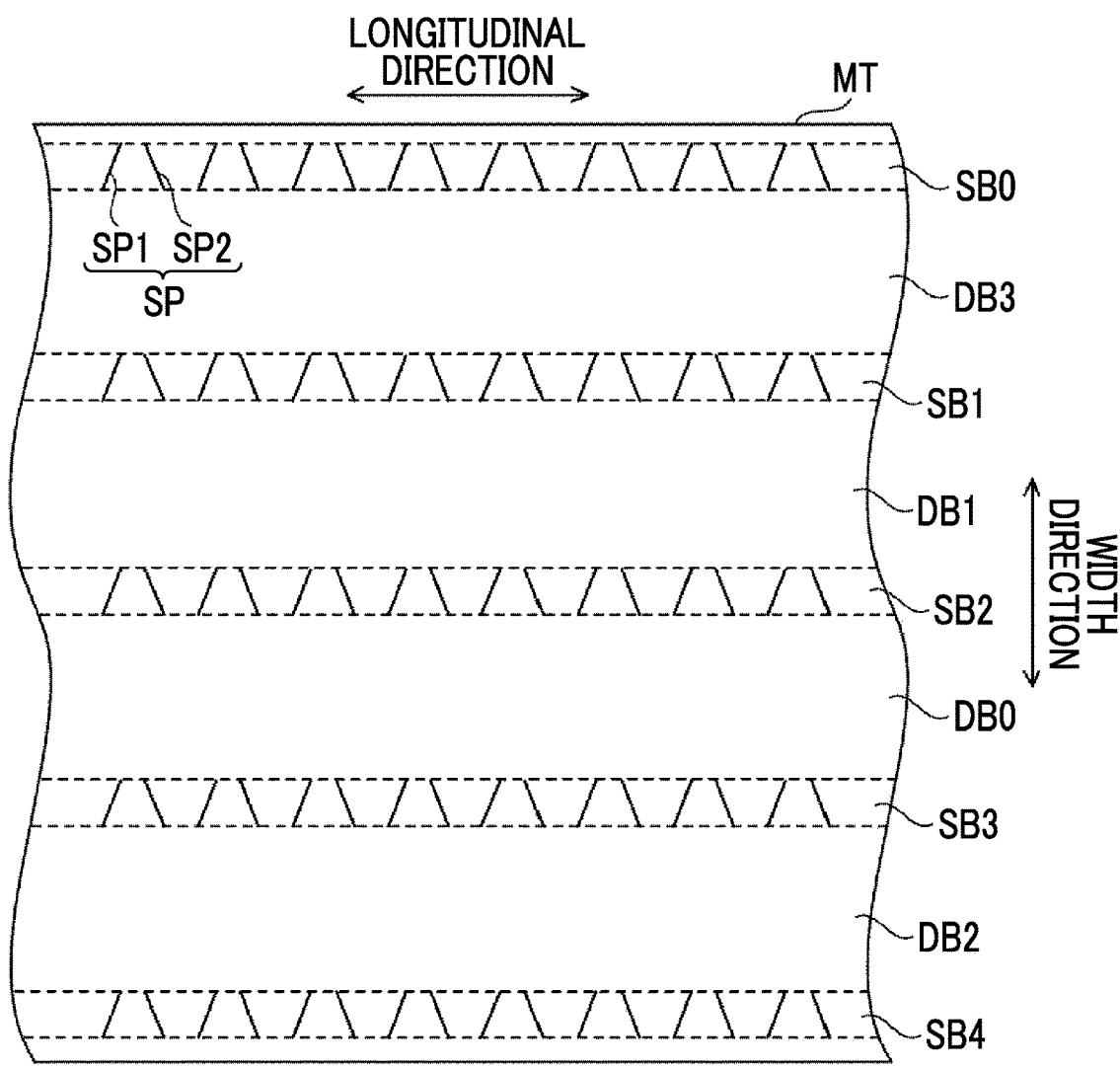
FIG. 2 is a plan view showing an example of a magnetic tape.

As shown in FIG. 2, five servo bands SB0 to SB4 are formed on the magnetic tape MT along a longitudinal direction of the magnetic tape MT. In addition, the five servo bands SB0 to SB4 are formed so as to be arranged in a width direction (short direction) of the magnetic tape MT at regular intervals. Data band DB0 to DB3, on which data is recorded, are formed between each of the five servo bands SB0 to SB4. Hereinafter, the five servo bands SB0 to SB4 are referred to as servo band SB, in a case where they are not distinguished, and the data bands DB0 to DB3 are referred to as data band DB, in a case where they are not distinguished from each other. In other words, the servo bands SB and the data bands DB are arranged alternately along the width direction of the magnetic tape MT. The number of the servo bands SB and the data bands DB is not limited to the example shown in FIG. 2. For example, the number of servo bands SB may be 3 and the number of data bands DB may be 2. Hereinafter, the longitudinal direction of the magnetic tape MT is referred to as a "tape longitudinal direction" and the width direction of the magnetic tape MT is referred to as a "tape width direction".

On the servo band SB, servo patterns SP for performing positioning of a magnetic head H (see FIG. 3) in the tape width direction are repeatedly formed in the tape longitudinal direction. The servo pattern SP includes a linear pattern SP1 and a linear pattern SP2 which are formed along the tape width direction to be tilted with respect to the tape width direction by a predetermined angle. The linear pattern SP2 is formed not to be parallel with the linear pattern SP1. In the embodiment, the linear pattern SP2 is formed so as to be linearly symmetrical to the linear pattern SP1, with respect to the linear line along the tape width direction. FIG. 2 shows an example in which the servo pattern SP includes one pair of the linear pattern SP1 and the linear pattern SP2, but the servo pattern SP may include the plurality of pairs of linear patterns SP1 and the linear patterns SP2.

Next, a process of positioning the magnetic head H with respect to the width direction of the magnetic tape MT on which the servo pattern SP is formed will be described with reference to FIGS. 3 and 4.

Figure 3:
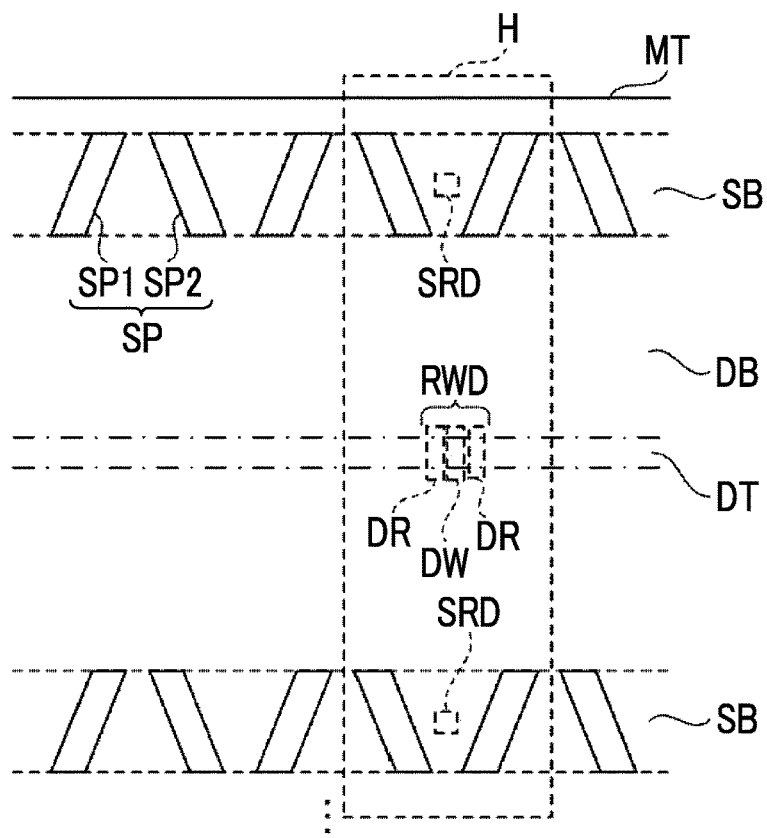
FIG. 3 is a plan view for explaining a positioning process of a magnetic head.

As shown in FIG. 3, the magnetic head H includes a servo reproducing element SRD which reproduces the servo pattern SP recorded on the servo band SB, and a recording and reproducing element RWD which performs recording or reproducing of data with respect to the data track DT. The recording and reproducing element RWD includes a data reproducing element DR which reproduces data and a data recording element DW which records data. In the embodiment, the recording and reproducing element RWD comprises the data reproducing elements DR on both sides of the data recording element DW in the tape longitudinal direction. This is because the data reproducing element DR arranged on a rear side in the running direction of the magnetic tape MT performs verification after recording data, with respect to the data recording element DW, in both cases of unwinding the magnetic tape MT from the magnetic tape cartridge 10 and winding the magnetic tape MT again. The reproducing here refers to reading a signal representing the servo pattern SP or data recorded on the magnetic tape MT. Hereinafter, the position of the magnetic head H, the position of the servo reproducing element SRD, and the position of the recording and reproducing element RWD, which are simply noted, respectively mean positions along the tape width direction.

The magnetic head H according to the embodiment comprises two servo reproducing elements SRD which read the servo patterns SP recorded on the servo bands SB adjacent to each other in the tape width direction. In addition, the recording and reproducing element RWD is arranged along the tape width direction between the two servo reproducing elements SRD.

In the embodiment, in a case where the magnetic tape MT runs in a predetermined running direction (for example, right to left direction in FIG. 3), the servo reproducing element SRD of the magnetic head H is positioned at a predetermined position of the servo band SB in the tape width direction, thereby positioning the magnetic head H with respect to the magnetic tape MT.

In a case where the linear pattern SP1 and the linear pattern SP2 pass through a detection position of the servo reproducing element SRD, the servo reproducing element SRD detects the linear pattern SP1 and the linear pattern SP2. In this case, the magnetic head H is positioned at a position so that a detection interval of the linear pattern SP1 and the linear pattern SP2 is a predetermined value. Accordingly, the recording and reproducing element RWD of the magnetic head H follows a predetermined data track DT. For the positioning of the magnetic head H, for example, an average value of the detection intervals of the two servo reproducing elements SRD is used.

Figure 4:
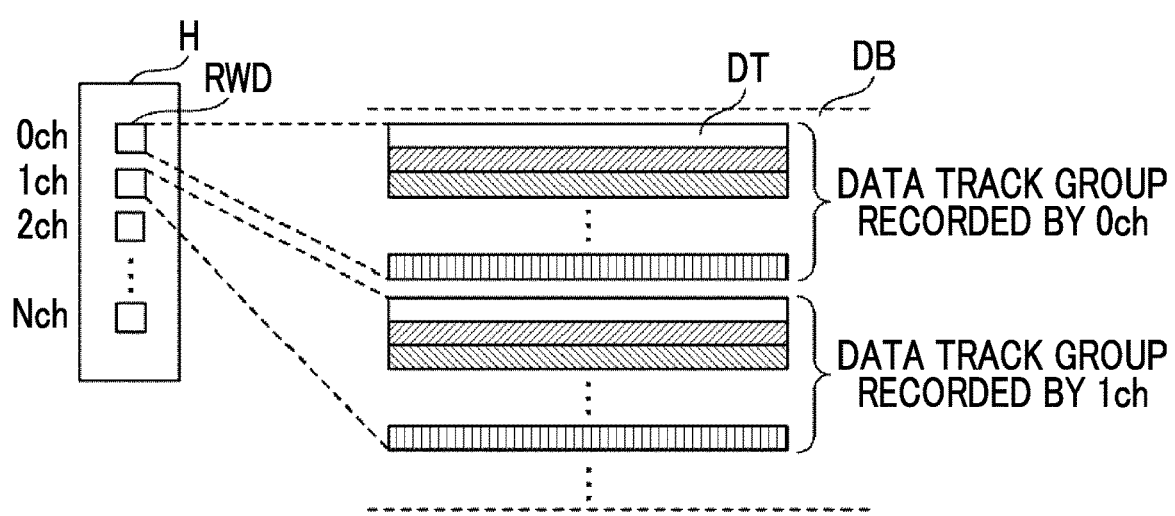
FIG. 4 is a diagram for explaining a process of recording or reproducing data by a recording and reproducing element.

In addition, as shown in FIG. 4, the plurality of recording and reproducing elements RWD can be arranged between the two servo reproducing elements SRD along the tape width direction and perform recording and reproducing of data at the same time with respect to the plurality of data tracks DT. In addition, as shown in FIG. 4, one data band DB includes a plurality of data track groups including a plurality of data tracks DT on which data is recorded by each recording and reproducing element RWD. In FIG. 4, the plurality of recording and reproducing elements RWD are referred to as 0ch, 1ch, 2ch, and Nch, respectively.

Meanwhile, the production process of the magnetic tape cartridge 10 includes a process of inspecting physical properties, magnetic recording properties, servo signal properties, and the like of the magnetic tape MT. In each process, in a case where the physical properties, magnetic recording properties, servo signal properties, and the like of the magnetic tape MT are determined to be unsuitable based on a quality management standard, the unsuitable part is detected as a "defect". Here, the "quality management standard" is defined by the specifications of the magnetic tape MT.

For example, in a case where the magnetic tape MT has the specifications of LTO Ultrium 1, the quality management standard is set as described in JIS X 6175. In JIS X 6175, a quality management standard of 12.650 mm±0.006 mm is determined for a tape width of the magnetic tape MT. Therefore, for example, in a case where a part having a tape width exceeding 12.656 mm or a part having a tape width less than 12.644 mm is detected as a result of inspection of the magnetic tape MT, the part is determined to be unsuitable and detected as a defect based on the quality management standard.

Generally, in a case where a defect is detected, there is a possibility of occurrence of a problem in recording and reproducing data with respect to the magnetic tape MT, and accordingly, a defective part including a defect is cut and discarded. However, by cutting the defective part, due to the convenience of the magnetic tape MT, a good part satisfying the quality management standard cannot be incorporated in the magnetic tape cartridge 10 and may be forced to be discarded. Discarding a good part of the magnetic tape MT is a waste of resources and increases the environmental load, which is not desirable.

Therefore, in a case where the magnetic tape MT containing a defect can be incorporated into the magnetic tape cartridge 10, it is possible to prevent disposal of good parts, that is, waste of resources, and increase in environmental load. For example, in a case where a part having a tape width of 12.657 mm is detected, as a result of inspection of the magnetic tape MT, it is detected as a defect because it is beyond the quality management standard by 0.001 mm. However, in a case where the deviation from the quality management standard is small as described above, there may be practically no problem in recording and reproducing data with respect to the magnetic tape MT. In addition, for example, even in a case where a part where data cannot be recorded and reproduced on a part of the magnetic tape MT is detected as a defect, there is no problem in recording and reproducing data with respect to the entire magnetic tape MT, in a case where recording and reproduction are performed while avoiding the defect.

An example of the configuration of a defect information recording system 20 for recording the defect information 14 on the RFID tag 12 of the magnetic tape cartridge 10 in the production process of the magnetic tape cartridge 10 will be described with reference to FIG. 5. As shown in FIG. 5, the defect information recording system 20 includes a recording device 22, a management device 30, a physical inspection device 32, a servo signal inspection device 34, a magnetic inspection device 36, and a finished product inspection device 38. The recording device 22 includes a control unit 24 including a central processing unit (CPU) and a memory as a temporary storage, and a recording unit 26 which records the defect information 14 on the RFID tag 12 in a contactless manner. An example of the recording unit 26 is an RFID writer.

The physical inspection device 32 includes, for example, a light irradiation unit (not shown) which irradiates the magnetic tape MT with light, and a detection unit (not shown) which detects a physical defect of the magnetic tape MT by receiving a reflected light of the light radiated by the light irradiation unit. Here, the physical defect is, for example, coating unevenness, coating omissions and streaks on a magnetic layer, and a width, a thickness and a stain of the magnetic tape MT not satisfying the quality management standard. Examples of the light irradiation unit include a halogen lamp, a high-intensity light emitting diode (LED), and a laser diode, and examples of the detection unit include a charge coupled device (CCD) camera, and the like. In addition, the physical inspection device 32 outputs data of a defect including a detected physical defect type and a position thereof on the magnetic tape MT to the management device 30.

The servo signal inspection device 34 includes, for example, a head (not shown) which reads a servo signal written on the magnetic tape MT, and a detection unit (not shown) which detects a defect of a servo pattern from the read servo signal. Here, the defect of the servo pattern is, for example, a tracking error that occurs in a case where the head cannot follow the servo pattern, a dropout that occurs in a case where the head cannot read the servo pattern, or the like. In addition, the servo signal inspection device 34 outputs data of a defect including the detected defect type of the servo pattern and the position thereof on the magnetic tape MT to the management device 30.

The magnetic inspection device 36 includes, for example, a head (not shown) which magnetically writes an inspection signal on each data track DT and read the written inspection signal, and a detection unit (not shown) which detects a magnetic defect from the read inspection signal. Here, the magnetic defect is, for example, a dropout that occurs in a case where the head cannot read the inspection signal, or a signal-to-noise ratio of the read inspection signal not satisfying the quality management standard. In addition, the magnetic inspection device 36 outputs data of a defect including a detected magnetic defect type and a position thereof on the magnetic tape MT to the management device 30.

The finished product inspection device 38 includes, for example, a light irradiation unit (not shown) which irradiates the magnetic tape MT with light after winding the magnetic tape MT in the magnetic tape cartridge 10, and a detection unit (not shown) which detects a defect of a finished product by receiving a reflected light of the light radiated by the light irradiation unit. Here, the defect of the finished product is, for example, a streak-like defect that is generated on the magnetic layer in a case where the magnetic tape MT is wound in the magnetic tape cartridge 10. In addition, the finished product inspection device 38 outputs data of a defect including a detected finished product defect type and a position thereof on the magnetic tape MT to the management device 30.

The management device 30 generates the defect information 14 based on the defect data obtained from each inspection device and outputs the defect information 14 to the recording device 22.

The control unit 24 obtains the defect information 14 from the management device 30. In addition, the control unit 24 controls the recording unit 26 to record the defect information 14 on the RFID tag 12 comprised in the magnetic tape cartridge 10 comprising the magnetic tape MT including the defect corresponding to the defect information 14.

FIG. 6 shows an example of the contents of the defect information 14. As shown in FIG. 6, the defect information 14 includes information indicating the type of defect, information indicating the position of the defect on the magnetic tape MT in the tape width direction, and the position of the defect on the magnetic tape MT in the tape longitudinal direction associated with each other. In the example of FIG. 6, types of defects are shown as error codes E01 to E04, positions in the tape width direction are shown as servo band numbers SB0 to SB4 and data band numbers DB0 to DB3 specified by the servo band ID, and the position in the longitudinal direction is shown as LPOS information.

For example, in a case where the physical inspection device 32 detects the coating omission of the magnetic layer at a position of the LPOS information 2058 in the data band DB1, the defect data indicating this is output to the management device 30. Based on the defect data, the management device 30 generates the defect information 14 in which an error code "E01" referring to coating omission, a position "DB1" in the tape width direction, and a position "2058" in the tape longitudinal direction are associated with each other.

In addition, for example, in a case where the magnetic inspection device 36 detects a dropout at a coating omission portion of the magnetic layer, defect data indicating this is output to the management device 30. Based on the defect data, the management device 30 generates the defect information 14 in which an error code "E02" referring to the dropout, the position "DB1" in the tape width direction, and the position "2058" in the tape longitudinal direction are associated with each other.

The defect information 14 may only include one of the information indicating the position in the tape width direction or the information indicating the position in the tape longitudinal direction. For example, a defect relating to the tape width may be only located in the tape longitudinal direction to identify its position. Therefore, based on the defect data, the management device 30 generates the defect information 14 in which an error code "E04" referring to a tape width defect and the position "36975" in the tape longitudinal direction are associated with each other.

Next, with reference to FIG. 7, an example of a flow of a defect information recording process for recording the defect information 14 on the RFID tag 12 of the magnetic tape cartridge 10 in the production process of the magnetic tape cartridge 10 will be described.

Figure 7:
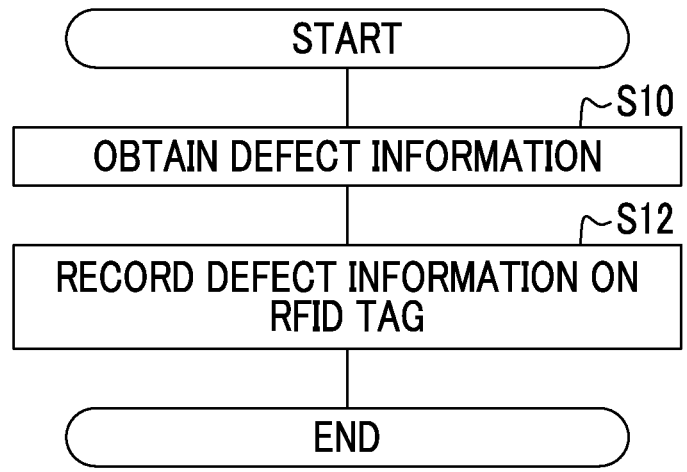
FIG. 7 is a flowchart showing an example of a defect information recording process.

In Step S10 of FIG. 7, the control unit 24 obtains the defect information 14 from the management device 30. In Step S12, the control unit 24 controls the recording unit 26 to record the defect information 14 on the RFID tag 12 comprised in the magnetic tape cartridge 10 comprising the magnetic tape MT including the defect corresponding to the defect information 14. In a case where the process of Step S12 ends, the defect information recording process ends.

Figure 8:
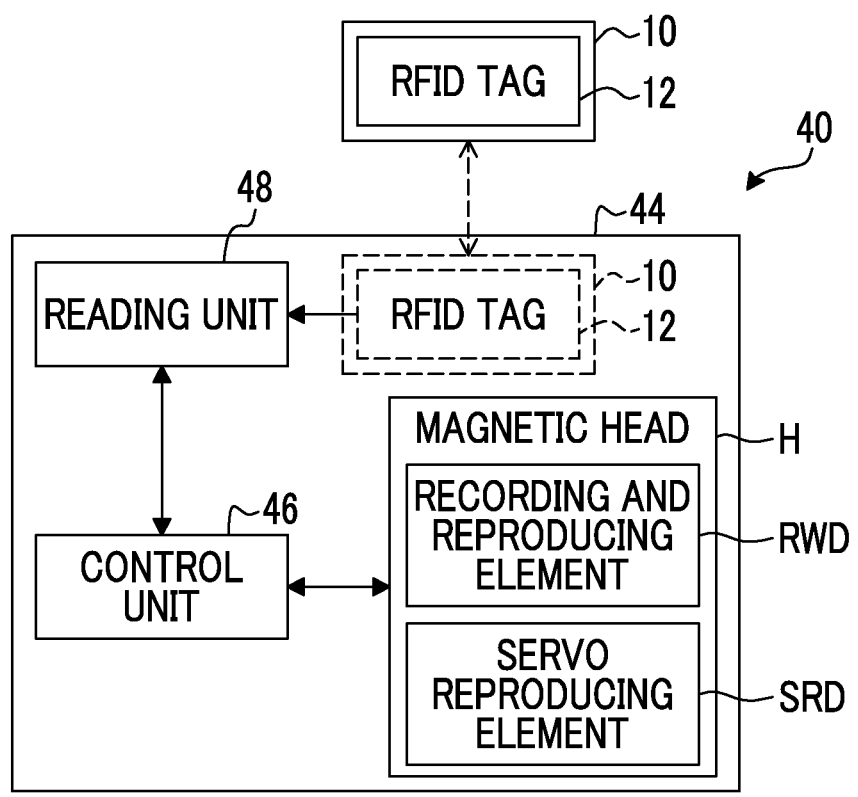
FIG. 8 is a block diagram showing an example of a configuration of a data recording and reproducing system.

Next, a configuration of a data recording and reproducing system 40 which performs recording and reproducing of data with respect to the shipped magnetic tape cartridge 10 will be described with reference to FIG. 8. As shown in FIG. 8, the data recording and reproducing system 40 comprises the magnetic tape cartridge 10, a tape drive 44, and a computer (not shown) for controlling the tape drive 44.

The magnetic tape cartridge 10 is loaded in the tape drive 44. In addition, after completing the recording or reproducing of the data with respect to the magnetic tape MT of the magnetic tape cartridge 10 loaded in the tape drive 44, the magnetic tape cartridge 10 is unloaded from the tape drive 44.

The tape drive 44 comprises a control unit 46, a reading unit 48, and the magnetic head H. The control unit 46 and the magnetic head H are an example of the recording and reproducing unit according to the technology of the disclosure.

The magnetic head H comprises the plurality of recording and reproducing elements RWD, and the plurality (in the embodiment, two) of servo reproducing elements SRD corresponding to each of the adjacent servo bands SB. In addition, in the embodiment, the number of recording and reproducing elements RWD comprised in the magnetic head H is the same as the number of data track groups comprised in one data band DB. The number of recording and reproducing elements RWD comprised in the magnetic head H may not be the same as the number of data track groups comprised in one data band DB.

The reading unit 48 reads the defect information 14 recorded on the RFID tag 12 embedded in the magnetic tape cartridge 10 in a contactless manner and outputs the read information to the control unit 46. An example of the reading unit 48 is an RFID reader.

The control unit 46 controls the magnetic head H so as to record or reproduce data with respect to the magnetic tape MT of the magnetic tape cartridge 10 based on the defect information 14 read by the reading unit 48. In addition, the control unit 46 includes a programmable logic device (PLD), a memory as a temporary storage, and a non-volatile storage unit. The control unit 46 may be realized by a processor other than the PLD, such as a CPU, or may be realized by a plurality types of processors. For example, in a case where the control unit 46 is realized by the CPU, the CPU has the same function as the PLD by executing the program.

Figure 9:
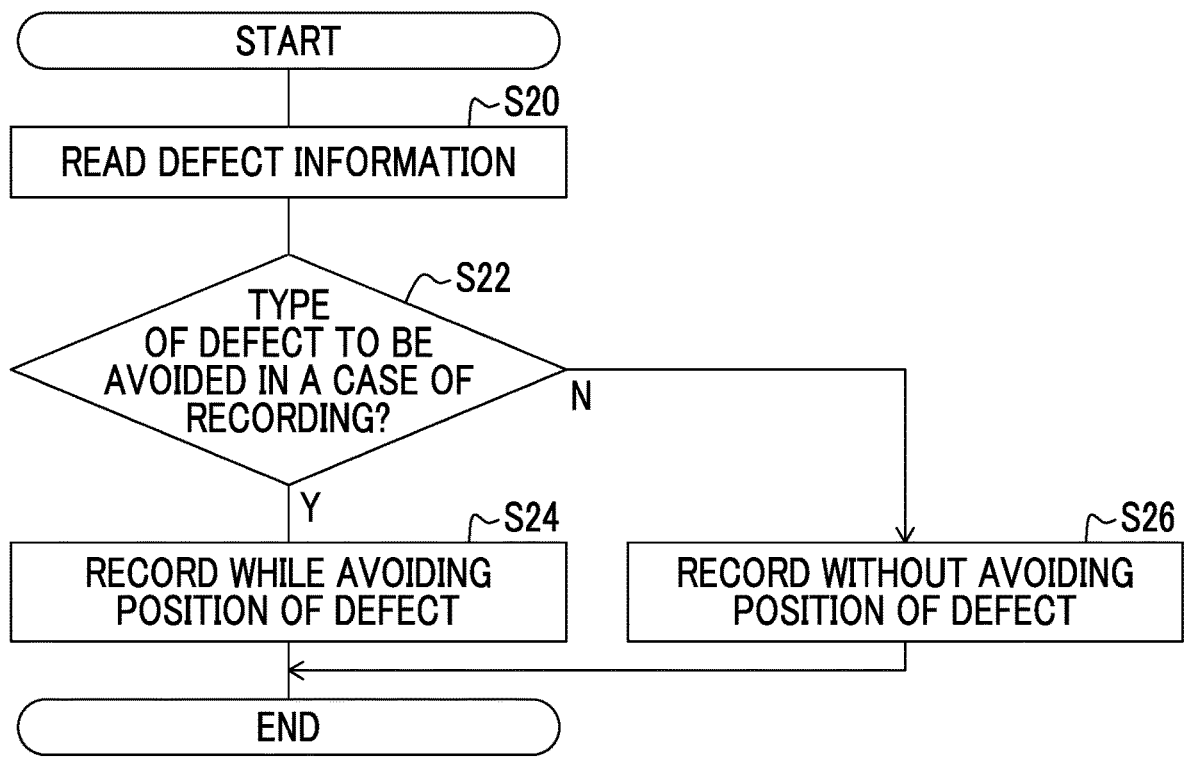
FIG. 9 is a flowchart showing an example of the data recording process.

Next, a flow of a data recording process for the data recording and reproducing system 40 to record data on the magnetic tape cartridge 10 will be described with reference to FIG. 9. The data recording process shown in FIG. 9 is executed, for example, in a case where recording target data is input to the control unit 46 of the tape drive 44 from a computer for controlling the tape drive 44. In addition, here, the data recording process is executed in a state where the magnetic tape cartridge 10 is loaded in the tape drive 44.

In Step S20 of FIG. 9, the control unit 46 controls the reading unit 48 to read the defect information 14 recorded on the RFID tag 12. Then, the control unit 46 obtains the defect information 14 read by the reading unit 48.

In Step S22, the control unit 46 determines whether to perform recording or reproducing of data with respect to the magnetic tape MT while avoiding the defect, or recording or reproducing of data with respect to the magnetic tape MT without avoiding the defect, according to the type of defect included in the defect information 14 obtained in Step 20. For example, in a case where the deviation from the quality management standard is small as described above, the defect regarding the tape width and the like may have no practical problem in recording and reproducing data with respect to the magnetic tape MT. Therefore, the control unit 46 stores information indicating whether or not to avoid defects for each defect type in the storage unit in advance, compares the information with the information indicating the defect type included in the defect information 14, and determines whether or not to avoid the defect. In a case where the determination is affirmative, the process proceeds to Step S24, and in a case where the determination is negative, the process proceeds to Step S26.

In Step S24, the control unit 46 controls the magnetic head H to record data on the magnetic tape MT while avoiding the position indicating the information indicating the position of the defect in the tape width direction, and the position indicated by the information indicating the position of the defect in the tape longitudinal direction included in the defect information 14.

In Step S26, the control unit 46 controls the magnetic head H to record the data on the magnetic tape MT without avoiding the position of the defect included in the defect information 14. In a case where the process of Step S24 or Step S26 ends, the data recording process ends. In a case where the recording of the recording target data on the magnetic tape MT is completed by the data recording process, the magnetic tape cartridge 10 is unloaded from the tape drive 44. After the completion of the recording of the recording target data on the magnetic tape MT, the next operation may be waited without unloading the magnetic tape cartridge 10 from the tape drive 44.

The process of reading the data recorded on the magnetic tape cartridge 10 can be executed in the same manner as the data recording process shown in FIG. 9.

Figure 10:
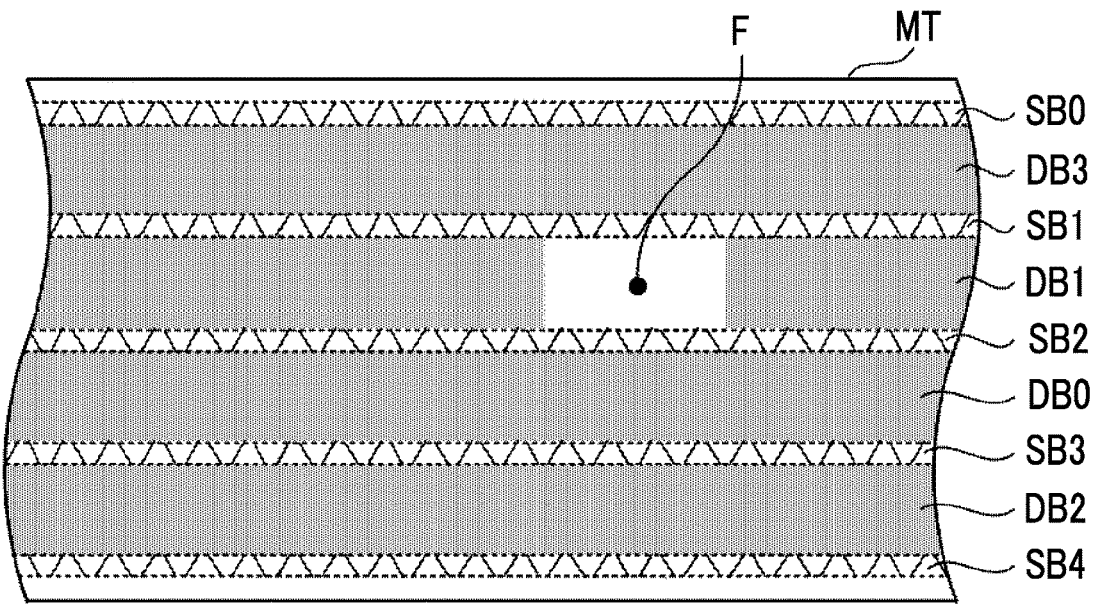
FIG. 10 is a diagram for explaining the data recording process.
Figure 11:
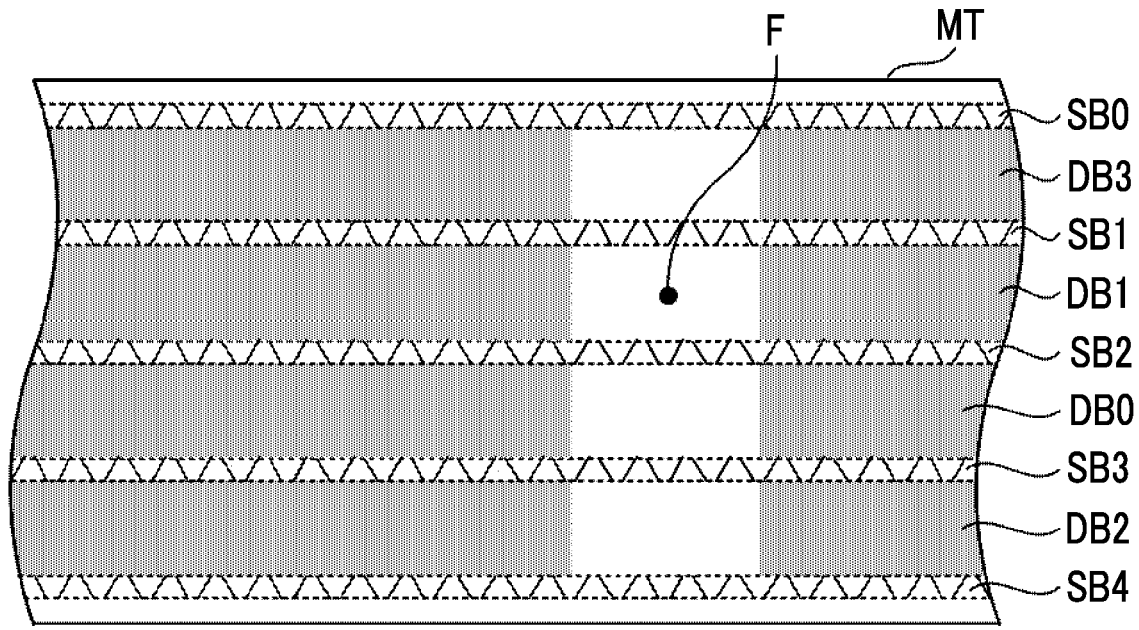
FIG. 11 is a diagram for explaining the data recording process.
Figure 12:
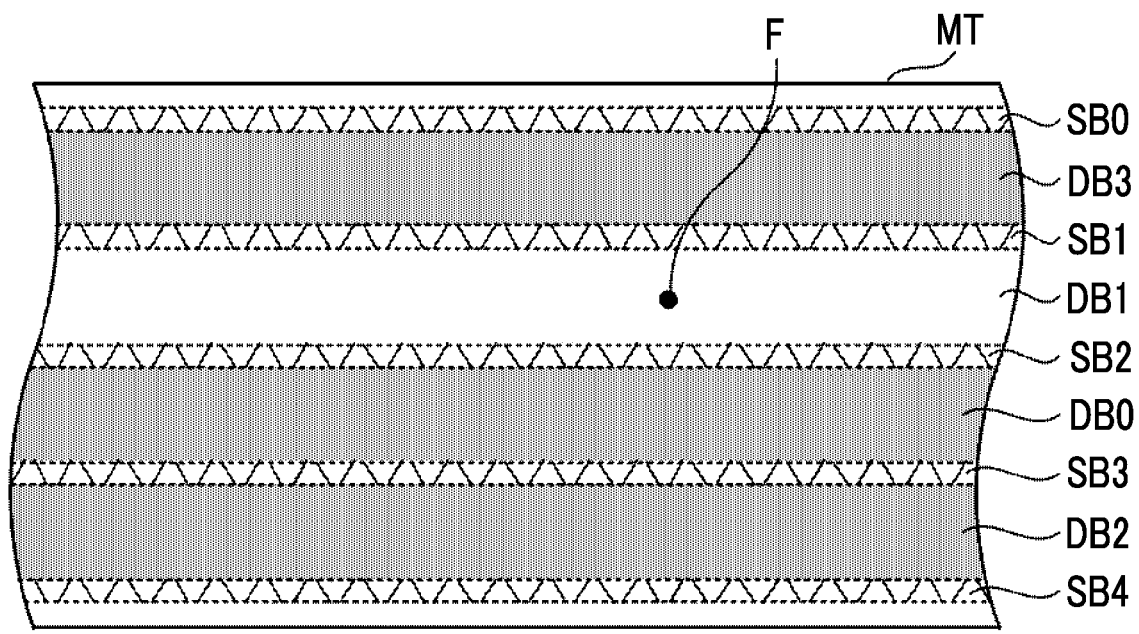
FIG. 12 is a diagram for explaining the data recording process.

FIGS. 10 to 12 are diagrams showing a state in which data is recorded on the magnetic tape MT including a defect F by the data recording process. Shaded portions in FIGS. 10 to 12 indicates the portions where data is recorded. The defect F in FIGS. 10 to 12 is assumed to be included in the defect information 14 as the defect type "E01", the position "DB1" in the tape width direction, and the position "2058" in the tape longitudinal direction.

For example, as shown in FIG. 10, the control unit 46 controls the magnetic head H to record or reproduce data with respect to the magnetic tape MT while avoiding the position indicated by the position "DB1" in the tape width direction and the position "2058" in the tape longitudinal direction of the defect F included in the defect information 14.

In addition, as described above, the defect information 14 may only include any one of the information indicating the position in the tape width direction or the information indicating the position in the tape longitudinal direction. In this case, the control unit 46 controls the magnetic head H to record or reproduce data with respect to the magnetic tape MT while avoiding any one position of the position in the tape width direction or the position in the tape longitudinal direction of the defect F included in the defect information 14.

For example, as shown in FIG. 11, the control unit 46 controls the magnetic head H to record or reproduce data with respect to the magnetic tape MT while avoiding the position "2058" in the tape longitudinal direction of the defect F included in the defect information 14. In addition, for example, as shown in FIG. 12, the control unit 46 controls the magnetic head H to record or reproduce data with respect to the magnetic tape MT while avoiding the position indicated by the position "DB1" in the tape width direction of the defect F included in the defect information 14.

As described above, according to the embodiment, the magnetic tape cartridge 10 comprises the magnetic tape MT, and the RFID tag 12 including a predetermined area for recording defect information 14, which is information regarding a defect of the magnetic tape MT detected in a production process of the magnetic tape MT. Therefore, in a case where the magnetic tape MT containing a defect can be incorporated into the magnetic tape cartridge 10, it is possible to prevent disposal of good parts without defect, that is, waste of resources, and increase in environmental load.

In the embodiment, the control unit 46 of the tape drive 44 has described to determine whether or not to record or reproduce data while avoiding a defect, but there is no limitation thereto. For example, a device other than the tape drive 44 (for example, the management device 30) may determine whether or not to record and reproduce data while avoiding a defect, and include the information indicating the determination result in the defect information 14. In this case, the control unit 46 controls the magnetic head H to record and reproduce data based on the information indicating the determination result included in the defect information 14.

In addition, in the embodiment, the control unit 46 of the tape drive 44 has described to determine whether or not to record or reproduce data while avoiding a defect according to the type of the defect, but there is no limitation thereto. For example, the control unit 46 may control the magnetic head H to record or reproduce the data while avoiding the defects included in the defect information 14, regardless of the defect type. In this case, the defect information 14 may not include information indicating the type of defect.

In addition, the physical inspection device 32, the servo signal inspection device 34, the magnetic inspection device 36, and the finished product inspection device 38 in the defect information recording system 20 shown in the above embodiment are examples of the inspection devices used in the production process of the magnetic tape cartridge 10, and there is no limitation thereto. For example, at least one of the above inspection devices may be used, or another inspection device may be added.

In addition, in the embodiment, it is described that the defect information 14 is recorded on the RFID tag 12, but there is no limitation thereto. For example, the defect information 14 may be repeatedly recorded on a leading part or over the entire length of the data band DB or the servo band SB of the magnetic tape MT accommodated in the magnetic tape cartridge 10. In addition, the defect information 14 may be recorded in a bar code recorded at a predetermined position on the outer peripheral surface of the magnetic tape cartridge 10. Further, the defect information 14 may be recorded in a two-dimensional code such as a QR code (registered trademark) recorded at a predetermined position on the outer peripheral surface of the magnetic tape cartridge 10.

In addition, in the above embodiment, the defect information 14 may be recorded in an external database. In this case, for example, identification information such as the serial number of the magnetic tape cartridge 10 is recorded on the RFID tag 12, a bar code, a two-dimensional code, or the like, and the defect information 14 is recorded in the database in association with the identification information of the magnetic tape cartridge 10.

What is claimed is:

1. A magnetic tape cartridge comprising:
a magnetic tape; and
a recording medium including a predetermined area that has defect information recorded on the predetermined area, which is information regarding a defect of the magnetic tape detected in a production process of the magnetic tape.

2. The magnetic tape cartridge according to claim 1, wherein the defect information includes information indicating a position of the defect on the magnetic tape in a longitudinal direction.

3. The magnetic tape cartridge according to claim 1, wherein the defect information includes information indicating a position of the defect on the magnetic tape in a width direction.

4. The magnetic tape cartridge according to claim 1, wherein the defect information includes information indicating a type of the defect.

5. The magnetic tape cartridge according to claim 1, wherein the defect is determined to be unsuitable based on a quality management standard of the magnetic tape.

6. The magnetic tape cartridge according to claim 5, wherein the quality management standard is defined by specifications of the magnetic tape.

7. The magnetic tape cartridge according to claim 1, wherein the recording medium is an RFID tag.

8. A recording device comprising: a recording unit which records the defect information on the recording medium of the magnetic tape cartridge according to claim 1.

9. A data recording and reproducing system comprising:
a reading unit which reads defect information recorded on the recording medium of the magnetic tape cartridge according to claim 1; and
a recording and reproducing unit which performs at least one of recording or reproducing of data with respect to the magnetic tape of the magnetic tape cartridge based on the defect information.

10. A recording method comprising:
recording defect information on a recording medium of a magnetic tape cartridge, the magnetic tape cartridge including: a magnetic tape, and the recording medium including a predetermined area for recording defect information, which is information regarding a defect of the magnetic tape detected in a production process of the magnetic tape.

11. A data recording and reproducing method comprising:
reading defect information recorded on a recording medium of a magnetic tape cartridge, the magnetic tape cartridge including: a magnetic tape, and the recording medium including a predetermined area for recording defect information, which is information regarding a defect of the magnetic tape detected in a production process of the magnetic tape, and
performing at least one of recording or reproducing of data with respect to the magnetic tape of the magnetic tape cartridge based on the defect information.

* * * * *